US008825091B2

(12) United States Patent
Lee et al.

(10) Patent No.: US 8,825,091 B2
(45) Date of Patent: Sep. 2, 2014

(54) METHOD AND APPARATUS FOR COMMUNICATION IN PORTABLE TERMINAL USING MULTIPLE SIM CARDS

(75) Inventors: Shin-Duck Lee, Gyeongsangbuk-do (KR); Chang-Hun Lee, Gyeongsangbuk-do (KR); Jong-Phil Lee, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 64 days.

(21) Appl. No.: 13/285,345

(22) Filed: Oct. 31, 2011

(65) Prior Publication Data

US 2012/0108273 A1 May 3, 2012

(30) Foreign Application Priority Data

Oct. 29, 2010 (KR) ........................ 10-2010-0107331

(51) Int. Cl.
*H04W 68/00* (2009.01)
(52) U.S. Cl.
USPC ........................ 455/458; 455/552.1; 455/558
(58) Field of Classification Search
USPC ........ 455/458, 434, 435.1–435.3, 552.1, 558; 370/328
See application file for complete search history.

(56) References Cited

U.S. PATENT DOCUMENTS

| 6,175,570 | B1* | 1/2001 | Cukier et al. | 370/414 |
| 2003/0153271 | A1* | 8/2003 | Brandt et al. | 455/67.1 |
| 2009/0215472 | A1* | 8/2009 | Hsu | 455/458 |
| 2011/0217969 | A1* | 9/2011 | Spartz et al. | 455/422.1 |

* cited by examiner

Primary Examiner — Marcos Torres
(74) Attorney, Agent, or Firm — Cha & Reiter, LLC

(57) ABSTRACT

The present disclosure relates to a method and an apparatus for communication in a portable terminal using multiple Subscriber Identity Module (SIM) cards. The method includes: camping on a predetermined cell by each of the multiple SIM cards; determining whether paging collision occurs between a communication network supported by the predetermined cell on which the portable terminal has camped through a SIM card and another communication network supported by the predetermined cell on which the portable terminal has camped through another SIM card; identifying paging information through a predetermined SIM card among the multiple SIM cards after identifying camp-on information for each SIM card when a result of the determination shows that the paging collision occurs; and performing a paging standby for the communication network in the predetermined camped-on cell by the SIM card corresponding to the identified paging information based on a result of identifying the paging information.

17 Claims, 3 Drawing Sheets

METHOD AND APPARATUS FOR COMMUNICATION IN PORTABLE TERMINAL USING MULTIPLE SIM CARDS

CLAIM OF PRIORITY

This application claims priority under 35 U.S.C. §119(a) to a Korean Patent Application entitled "Method and Apparatus for Communication in Portable Terminal Using Multiple SIM Cards" filed in the Korean Intellectual Property Office on Oct. 29, 2010 and assigned Serial No. 10-2010-0107331, the contents of which are incorporated herein by reference.

BACKGROUND OF THE INVENTION

1. Field of the Invention

The present invention relates to a portable terminal, and more particularly to a method and an apparatus for communication in a portable terminal using multiple Subscriber Identity Module (SIM) cards.

2. Description of the Related Art

A dual standby and dual mode portable terminal uses multiple (e.g. two) SIM cards so that a user can select a desired SIM card for communication according to the user's need.

In order to perform communication, a portable terminal must go through a process of registering itself in a network of a mobile communication network using information recorded in a SIM card. After registering in a Public Land Mobile Network (PLMN), a particular cell in the network supported by the SIM card is selected. After camping on the particular cell in the network, the portable terminal identifies paging information and then determines whether the SIM card corresponds to a paging interval of the network on which the portable terminal has camped. When the SIM card corresponds to the paging interval of the network, the portable terminal converts to a paging standby mode. Herein, the term "paging standby" refers to identifying whether uplink/downlink data related to a communication network in a cell is generated. For example, the paging standby is served to identify whether a call request, etc. occurs.

A portable terminal using multiple SIM cards also camps on a cell corresponding to each SIM card and then performs the paging standby, so that the portable terminal can perform communication. However, the portable terminal using the multiple SIM cards may simultaneously camp on the same cell through the multiple SIM cards which may cause paging collision. When the paging collision occurs, the portable terminal can use only a network of the mobile communication network corresponding to one SIM card (e.g. a SIM card through which the portable terminal has first camped on a cell) out of the multiple SIM cards. As a result, the function of a dual standby and dual mode portable terminal which can simultaneously use the multiple SIM cards is not operative.

Hence, there is a need for proposing a solution which can solve the paging collision when paging collision occurs in the portable terminal using the multiple SIM cards.

SUMMARY OF THE INVENTION

Accordingly, the present invention has been made to solve the above-mentioned problems occurring in the prior art and provides additional advantages, by providing a method and an apparatus for enabling communication in a portable terminal using multiple SIM cards, by which communication can be performed using all the multiple SIM cards in the event that a paging collision occurs in the portable terminal.

In accordance with an aspect of the present invention, there is provided a method for communication in a portable terminal using multiple Subscriber Identity Module (SIM) cards. The method includes: camping on a predetermined cell by each of the multiple SIM cards; determining whether a paging collision occurs between a communication network supported by the predetermined cell on which the portable terminal has camped through a SIM card and another communication network supported by the predetermined cell on which the portable terminal has camped through another SIM card; identifying paging information through a predetermined SIM card among the multiple SIM cards after identifying camp-on information when a result of the determination shows that the paging collision occurs; and performing a paging standby for the communication network in the predetermined camped-on cell by the SIM card corresponding to the identified paging information based on a result of identifying the paging information.

In accordance with another aspect of the present invention, there is provided an apparatus for communication in a portable terminal using multiple Subscriber Identity Module (SIM) cards. The apparatus includes: a first SIM card and a second SIM card including user information; and a controller for camping on a predetermined cell through each of the first SIM card and the second SIM card, determining whether a paging collision occurs between a communication network supported by the predetermined cell on which the portable terminal has camped through the first SIM card and another communication network supported by the predetermined cell on which the portable terminal has camped through the second SIM card, and then identifying paging information through either the first SIM card or the second SIM card after identifying camp-on information when a result of the determination shows that the paging collision occurs, and performing a paging standby for the communication network in the predetermined camped-on cell through the SIM card corresponding to the identified paging information.

BRIEF DESCRIPTION OF THE DRAWINGS

The above and other exemplary features, aspects, and advantages of the present invention will be more apparent from the following detailed description taken in conjunction with the accompanying drawings, in which.

DETAILED DESCRIPTION

Hereinafter, exemplary embodiments of the present invention will be described in detail with reference to the accompanying drawings.

Figure 1:
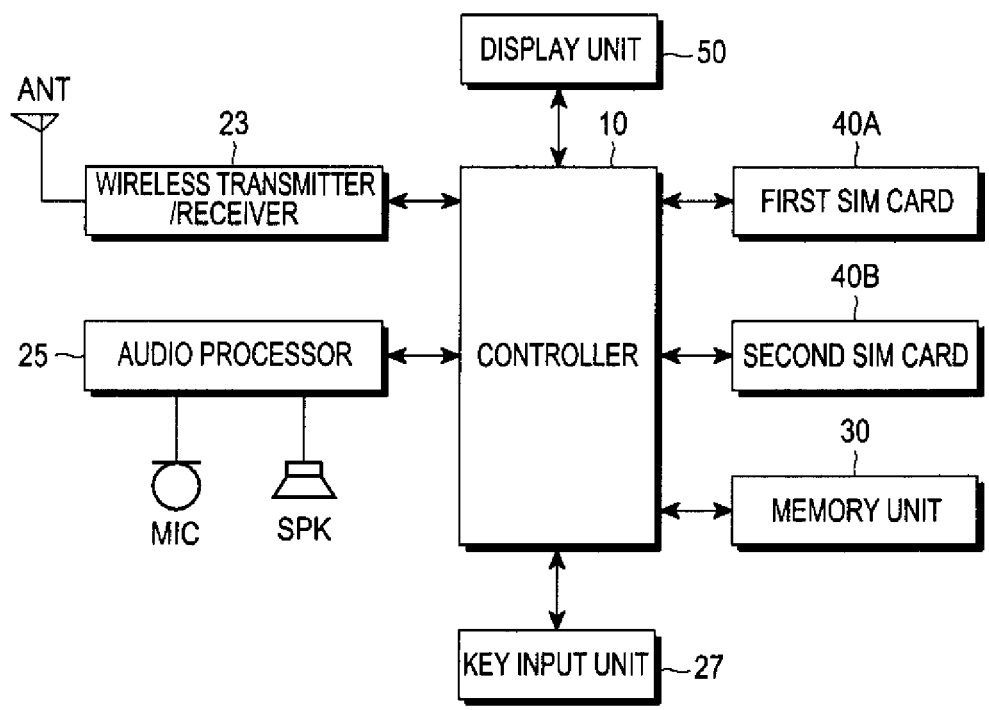
FIG. 1 is a block diagram illustrating the configuration of a portable terminal according to an exemplary embodiment of the present invention.

FIG. 1 is a block diagram illustrating the configuration of a portable terminal according to an exemplary embodiment of the present invention. Although devices, including a GPS (Global Positioning System) module, a camera module, a Bluetooth module, a Wi-Fi (Wireless Fidelity) module, an acceleration sensor, a proximity sensor, a Geo-magnetic sensor, a DMB (Digital Media Broadcasting) receiver, etc., which may be included in a portable terminal, are not shown in FIG. 1, it will be apparent to those skilled in the art that these devices may be included in a portable terminal according to an exemplary embodiment of the present invention in order to provide the relevant functions of these devices.

The portable terminal according to an exemplary embodiment of the present invention may include a mobile electronic device, which may be either a videophone, a mobile phone, a smart phone, an IMT 2000 (International Mobile Telecommunication 2000) terminal, a WCDMA (Wideband Code Division Multiple Access) terminal, a UMTS (Universal Mobile Telecommunication Service) terminal, a PDA (Personal Digital Assistant), a PMP (Portable Multimedia Player), a DMB (Digital Multimedia Broadcasting) receiver, a PC (Personal Computer), a desktop computer, or a laptop computer.

Further, the portable terminal according to an exemplary embodiment of the present invention may include at least two SIM cards including a first SIM card 40A and a second SIM card 40B, and the first and second SIM cards 40A and 40B may be mounted or detached (e.g. removable) on/from the portable terminal through corresponding SIM card sockets (not shown). Since the first SIM card 40A and the second SIM card 40B are dual mode and dual standby mode smart cards, the portable terminal according to an exemplary embodiment of the present invention can perform communication through each of the first and second SIM cards 40A and 40B.

Each of the first and second SIM cards 40A and 40B may include information, including IMSI (International Mobile Subscriber Identity), an authentication key, subscriber information, an access control class, a cipher key, TMST (Temporary Mobile Subscriber Identity), an additional GSM (Global System for Mobile Communication) service, LAI (Locating Area Identity), forbidden PLMN (Public Land Mobile Network), etc. Also, the first and second SIM cards 40A and 40B are protected by a PIN (Personal Identity Number) and a PUK (Personal Unlocking Key). A PIN, which is a code generated by combining 4-digit numbers, for example, serves as a user password for using a SIM card. Further, a PUK is used to release a locked SIM card when the SIM card is locked after several incorrect entries of a PIN.

Meanwhile, it is assumed that the first SIM card 40A and the second SIM card 40B according to an exemplary embodiment of the present invention support only GSM communication. Namely, the paging collision, which occurs when the multiple SIM cards have camped on the same cell, implies that the multiple SIM cards are smart cards used in the same communication scheme, i.e., a GSM scheme. Therefore, the first SIM card 40A and the second SIM card 40B include subscriber information and authentication information used for GSM communication, and may include record information related to wireless communication, etc.

As shown in FIG. 1, a wireless transmitter/receiver 23 includes an RF (Radio Frequency) unit and a modem (modulator/demodulator). The RF unit includes an RF transmitter for upconverting the frequency of a signal to be transmitted and then amplifying the frequency-upconverted signal, an RF receiver for low-noise amplifying a received signal and then downconverting the frequency of the low-noise amplified signal, etc. The modem includes a transmitter for encoding and modulating a signal to be transmitted, and a receiver for demodulating and decoding a signal received by the RF unit, etc. Meanwhile, although a wireless transmitter/receiver can support both a CDMA scheme and a GSM scheme through being equipped with multiple antennas (ANTs), it is assumed that the wireless transmitter/receiver 23 according to an exemplary embodiment of the present invention supports only a communication network employing the GSM scheme.

An audio processor 25 may include a codec (coder/decoder), which may include a data codec and an audio codec. The data codec processes packet data, etc., and the audio codec processes audio signals including voice, a multimedia file, etc. The audio processor 25 converts a digital audio signal, which has been received by the modem, to an analog signal through the audio codec, and then reproduces the analog signal. Also, the audio processor 25 converts an analog audio signal, which is generated from a microphone, to a digital audio signal through the audio codec, and then transmits the digital audio signal to the modem. The codec may be separately provided, or may be included in a controller 10 of the portable terminal.

A key input unit 27 may include keys for inputting numbers and text information and function keys for setting various functions, and may be in the form of either a touchpad or the like.

A memory unit 30 may include a program memory and a data memory. The program memory stores programs for controlling a general operation of the portable terminal. In this case, the memory unit 30 according to an exemplary embodiment of the present invention may include external memories, including a CF (Compact Flash) memory card, an SD (Secure Digital) memory card, a Micro-SD (Micro Secure Digital) memory card, a Mini-SD (Mini Secure Digital) memory card, an XD (Extreme Digital) memory card, a memory stick, etc.

The display unit 50 may be implemented by an LCD (Liquid Crystal Display), and/or an OLED (Organic Light-Emitting Diode, such as either a PMOLED (Passive Matrix Organic LED) or an AMOLED (Active Matrix Organic LED, and outputs various pieces of display information provided by the portable terminal. The display unit 50 according to an exemplary embodiment of the present invention may include a touchscreen and serves as an input unit for controlling the portable terminal along with the key input unit 27.

The controller 10 may control an overall operation of the portable terminal according to an exemplary embodiment of the present invention, and may change and control the operation of the portable terminal by a user's input provided by either the key input unit 27, the display unit 50, or the like. When the multiple SIM cards have camped on the same cell and paging collision occurs, the controller 10 according to an exemplary embodiment of the present invention first identifies camp-on information corresponding to each of the multiple SIM cards, and then identifies a paging block (i.e. paging information) from the camped-on cell through the SIM card which has first camped on the same cell. Thereafter, when the identified paging information is paging information corresponding to the first SIM card 40A, the controller 10 processes the paging through the first SIM card 40A, and when the identified paging information is paging information corresponding to the second SIM card 40B, the controller 10 processes the paging through the second SIM card 40B. A detailed operation of the controller 10 according to an exemplary embodiment of the present invention will be described in the following exemplary embodiment of the present invention.

Figure 2:
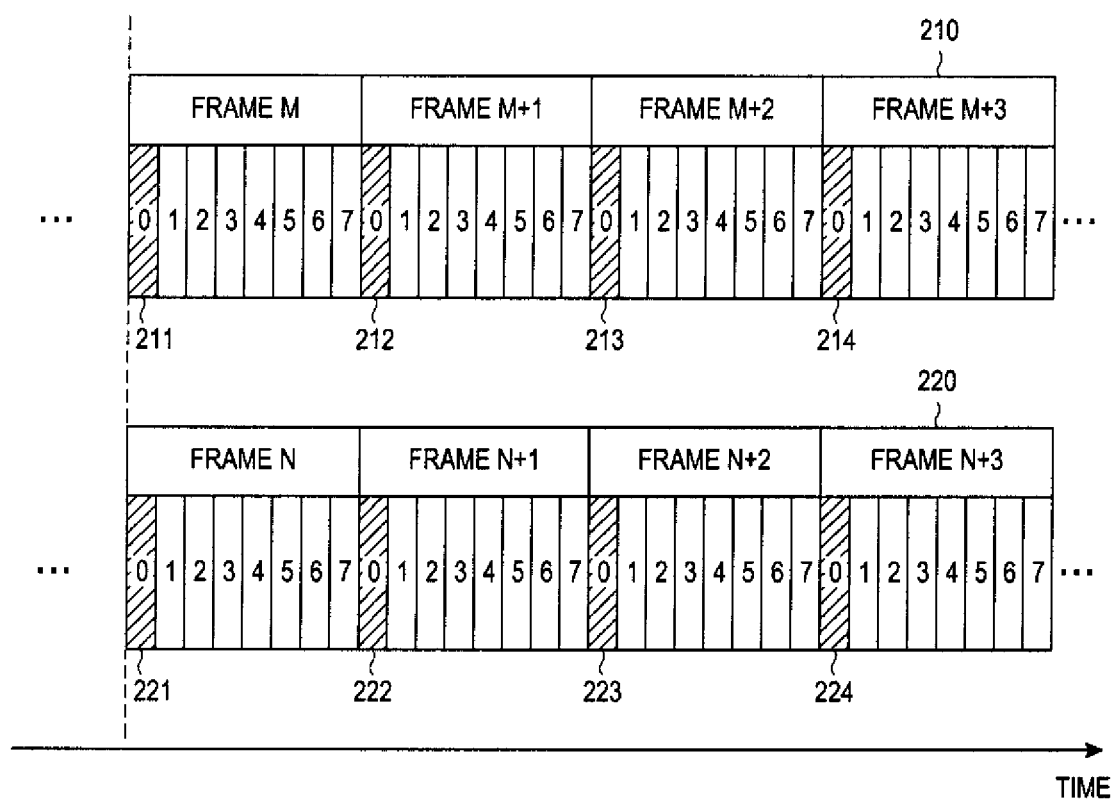
FIG. 2 is an explanatory view showing a case where multiple SIM cards have camped on the same cell and paging collision occurs.

FIG. 2 is an illustrative view showing a case where the multiple SIM cards have camped on the same cell and a paging collision occurs.

As shown in FIG. 2, each of reference numerals 210 and 220 denote some four frames among frames of the GSM scheme. In an exemplary embodiment of the present invention, it is assumed that a frame denoted by reference numeral 210 is received from a cell on which the portable terminal has camped through the first SIM card 40A and a frame denoted by reference numeral 220 is received from a cell on which the portable terminal has camped through the second SIM card 40B. Herein, the term "cell" refers to a coverage area controlled by a single Base Station (BS), and in a GSM communication network, each cell is identified by a Cell Global Identity (CGI) which is a number assigned to each cell.

Since the portable terminal according to an exemplary embodiment of the present invention is a dual standby and/or dual mode portable terminal, the portable terminal can perform communication using the two SIM cards including the first SIM card 40A and the second SIM card 40B.

When the portable terminal camps on the same one cell through the first SIM card 40A and the second SIM card 40B, paging periods may start at the same time point (i.e. m is equal to n) as shown in FIG. 2. At this time, a problem occurs in that paging collision occurs and then the portable terminal according to the present invention performs communication through either the first SIM card 40A or the second SIM card 40B.

Reference numerals 211 to 214 denote a case where a paging block (i.e. paging information) is included in a first slot of each frame among some frames, which are received from a cell on which the portable terminal has camped through the first SIM card 40A. Also, reference numerals 221 to 224 denote a case where a paging block is included in a first slot of each frame among some frames, which are received from a cell (i.e. the same cell on which the portable terminal has camped through the first SIM card 40A) on which the portable terminal has camped through the second SIM card 40B.

A frame structure in the GSM scheme will be described below.

A single frame includes 8 slots including information bits and control bits, and a single time slot includes 156.25 bits (3+57+1+26+1+57+3+8.25). The single time slot includes two sets of information bits having 57 bits, and the remaining bits which include a flag for distinguishing between other information and user information, a training sequence for equalization, tail bits notifying the start and the end of the time slot, and guard bits for preventing a relevant signal from overlapping another signal transmitted by another terminal. Training bits are located in the middle of a burst so that a receiver may be synchronized with the burst. In the GSM scheme, signals arrive at the receiver at about the same time point and thus eight types of training sequences are used.

In the GSM scheme, two types of multiframes are used. One is a 26-multiframe which has 26 frames and is maintained for 120 ms, and the other corresponding to a superframe is a 51-multiframe which has 51 frames and is maintained for 235.4 ms. The 26-multiframe is used for communications including a traffic channel, a SACCH (Slow Associated Control Channel), a FACCH (Fast Associated Control Channel), etc.

The 51-multiframe is used for communications including a BCCH (Broadcast Control Channel), a CCCH (Common Control Channel), an SDCCH (Stand-alone Dedicated Control Channel), etc.

Figure 3:
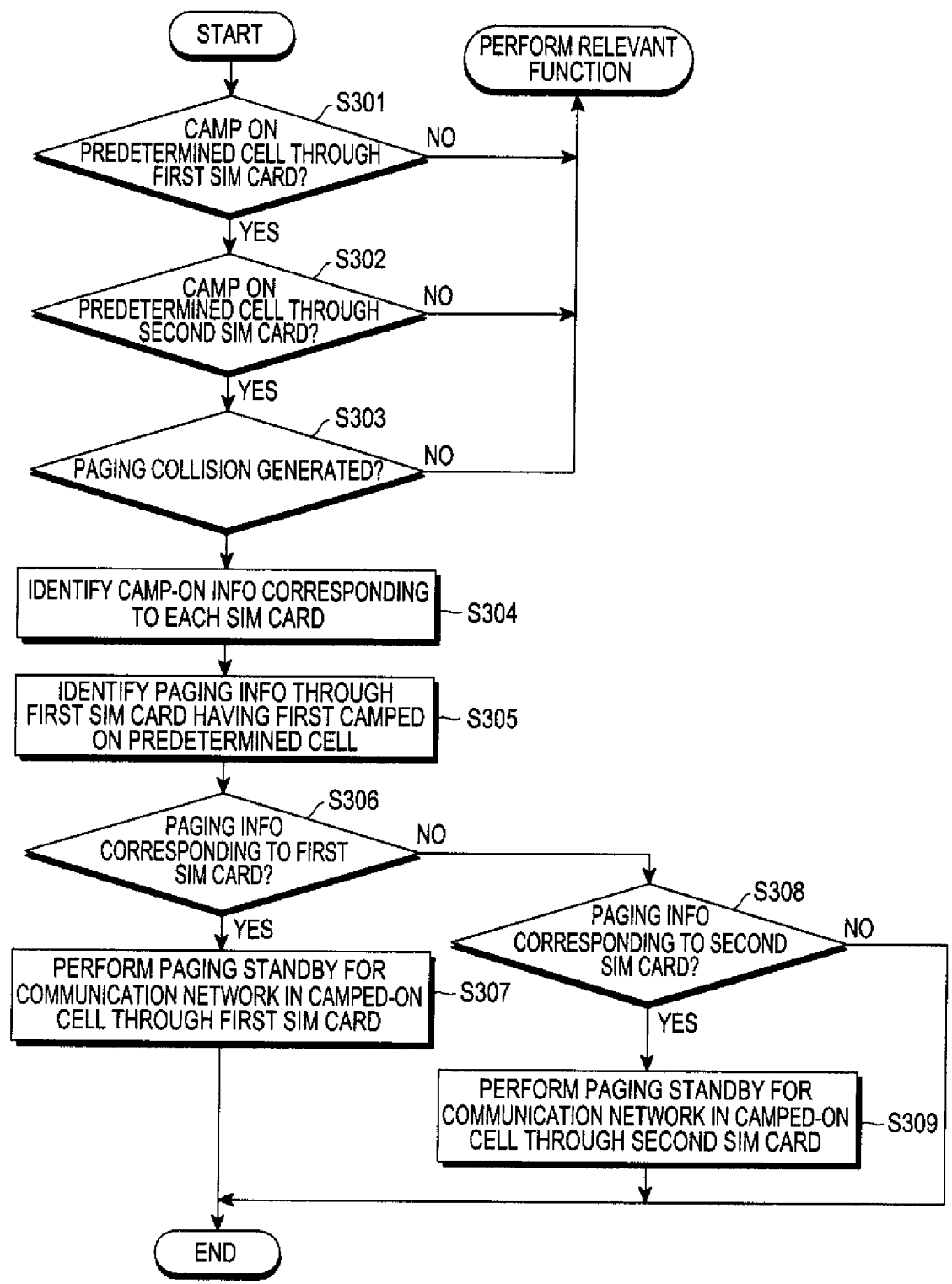
FIG. 3 is a flowchart showing a process for responding to generated paging collision according to an exemplary embodiment of the present invention.

FIG. 3 is a flowchart showing a process for responding to generated paging collision according to an exemplary embodiment of the present invention. In steps S301 to S303, the controller 10 of the portable terminal determines whether the portable terminal has camped on a predetermined cell through the first SIM card 40A, and then determines whether the portable terminal has camped on the predetermined cell through the second SIM card 40B. Next, the controller 10 determines whether a paging collision occurs between a communication network supported by the first SIM card 40A when the portable terminal has camped on the predetermined cell and another communication network supported by the second SIM card 40B when the portable terminal has also camped on the predetermined cell.

The controller 10 scans and registers, and then camps on a communication network in each cell surrounding the portable terminal by using information stored in the first SIM card 40A and the second SIM card 40B. Since the portable terminal according to an exemplary embodiment of the present invention is a dual mode and/or dual standby portable terminal which may use the multiple (e.g. two) SIM cards, it may camp on a cell through each of the first SIM card 40A and the second SIM card 40B.

Note that when a single portable terminal includes two SIM cards and camps on a cell through each of the two SIM cards, the single portable terminal usually has a low probability that it may simultaneously camp on the same cell through the two SIM cards. However, when the two SIM cards inserted into the single portable terminal support only a communication network employing a TDMA scheme such as a GSM scheme, the single portable terminal has the higher possibility that it may camp on the same one cell through the two SIM cards.

Therefore, the controller 10 according to an exemplary embodiment of the present invention identifies frames of the GSM scheme as shown in FIG. 2 from the predetermined cell, on which the portable terminal has camped through each of the first SIM card 40A and the second SIM card 40B, and then determines whether the paging collision occurs. Namely, the controller 10 determines whether a paging period in the predetermined cell, on which the portable terminal has camped through the first SIM card 40A, is equal to another paging period in the predetermined cell on which the portable terminal has camped through the second SIM card 40B.

In steps S304 and S305, the controller 10 identifies both camp-on information through the predetermined cell on which the portable terminal has camped through the first SIM card 40A and camp-on information through the predetermined cell on which the portable terminal has camped through the second SIM card 40B, and then identifies paging information through the first SIM card 40A through which the portable terminal has first camped on the predetermined cell.

The controller 10 identifies the camp-on information through a BCCH channel from the predetermined cell (i.e. the same cell) on which the portable terminal has camped through each of the first SIM card 40A and the second SIM card 40B. Herein, the camp-on information, which is System Information (SI) broadcasted from the predetermined camped-on cell, corresponds to information that the portable terminal needs in order to use a communication network in a cell.

Thereafter, the controller 10 identifies the paging information through the first SIM card 40A through which the portable terminal has first camped on the predetermined cell. Since a frame of the GSM scheme uses 4 frames as a basic information unit, the controller 10 according to an exemplary embodiment of the present invention identifies a paging block (i.e. paging information) included in a first slot of each frame on a basis of 4 frames, such as the 4 frames denoted by reference numeral 210 shown in FIG. 2. Then, the controller 10 determines whether the identified paging information is paging information corresponding to the first SIM card 40A or the second SIM card 40B. For example, the controller 10 identifies a paging block on a basis of 4 frames in 51 superframes or 2,048 hyperframes, and then determines whether the identified paging information is paging information corresponding to the first SIM card 40A or the second SIM card 40B.

In steps S306 and S307, since a result of the determination in step S306 shows that the identified paging information is paging information corresponding to the first SIM card 40A, the controller 10 performs paging standby for a communication network in the camped-on cell through the first SIM card 40A. On the other hand, in steps S308 and S309, since the result of the determination in step S306 shows that the identified paging information is paging information corresponding to the second SIM card 40B, the controller 10 performs paging standby for another communication network in the camped-on cell through the second SIM card 40B.

The controller 10 determines whether the paging information identified based on the result of the identification in step S305 corresponds to the first SIM card 40A or the second SIM card 40B, and then performs the paging standby for the communication network in the camped-on cell through either the first SIM card 40A or the second SIM card 40B. As described above, a predetermined cell, for which paging standby is performed through the first SIM card 40A, is the same as a predetermined cell for which paging standby is performed through the second SIM card 40B.

Namely, when paging collision has occurred, the controller 10 periodically identifies the paging information on a basis of 4 GSM frames, and then determines whether the identified paging information is paging information corresponding to the first SIM card 40A or the second SIM card 40B. By periodically identifying the paging information, the controller 10 may perform the paging standby for the camped-on cell through the SIM card corresponding to the identified paging information. Therefore, the use of both the first SIM card 40A and the second SIM card 40B of the portable terminal is possible during the paging standby when there is a paging collision which prevented the use of cards in the prior art. Accordingly, the use of the multiple SIM cards according to the teachings of the present invention can solve the inconvenience of communication performed by using only one of the multiple SIM cards due to the occurrence of paging collision as in the prior art.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described in detail with reference to certain exemplary embodiments thereof, the above-described exemplary embodiments are only for an illustrative purpose and are not meant to be a limitation of the present invention. Therefore, changes in the elements, such that an element may be equally replaced by another element in an embodiment of the present invention without departing from the technical art or field of the present invention provided by the appended claims, will fall within the scope of the present invention. Therefore, the spirit and scope of the present invention must be defined not by the described embodiments thereof but by the appended claims and equivalents of the appended claims.

What is claimed is:

1. A method for enabling communication in a portable terminal using multiple Subscriber Identity Module (SIM) cards, the method comprising:
camping on a same predetermined cell by at least a first SIM card and a second SIM card;
determining whether a paging collision has occurred between a first communication network on which the portable terminal has camped through the first SIM card and a second communication network on which the portable terminal has camped through the second SIM card;
when the page collision has occurred identifying camp-on information for each of the first and second SIM cards;
identifying paging information based on the camp-on information;
determining whether the paging information corresponds to the first SIM card; and
if the paging information corresponds to the first SIM card, performing a paging standby for the first communication network.

2. The method as claimed in claim 1, wherein each of the first and second communication networks corresponds to a communication network employing a Global System for Mobile Communication (GSM) scheme.

3. The method as claimed in claim 2, wherein the paging information is identified by reading a paging block in a respective slot of at least four GSM frames of the GSM scheme.

4. The method as claimed in claim 2, wherein determining whether the paging collision has occurred comprises identifying GSM frames on which the portable terminal has camped through each of the first SIM card and the second SIM card.

5. The method as claimed in claim 4, wherein determining whether the paging collision has occurred comprises determining whether a first paging period for the first SIM card is equal to a second paging period for the second SIM card.

6. The method as claimed in claim 1, wherein the camp-on information is identified through a Stand-alone Dedicated Control Channel (SDCCH) from a predetermined cell.

7. The method as claimed in claim 1, wherein the camp-on information is System Information (SI) broadcasted from a predetermined cell to access the first and second communication networks.

8. The method as claimed in claim 1, before determining whether a paging collision has occurred, further comprising:
camping on a predetermined cell by each of the first and second SIM cards.

9. The method as claimed in claim 1, further comprising:
if the paging information doesn't correspond to the first SIM card, performing the paging standby for the second communication network.

10. A portable terminal using multiple Subscriber Identity Module (SIM) cards, the portable terminal comprising:
a first SIM card and a second SIM card, each of the first and second SIM cards including user information; and
a controller configured to:
camp on a same predetermined cell by at least a first SIM card and a second SIM card, and to determine whether a paging collision has occurred between a first communication network on which the portable terminal has camped through the first SIM card and a second communication network on which the portable terminal has camped through the second SIM card,
when the page collision has occurred, identify camp-on information for each of the first and second SIM cards,
identify paging information based on the camp-on information,
determine whether the paging information corresponds to the first SIM card, and if the paging information corresponds to the first SIM card, perform a paging standby for the first communication network.

11. The portable terminal as claimed in claim 10, wherein each of the first and second communication networks corresponds to a communication network employing a Global System for Mobile Communication (GSM) scheme.

12. The portable terminal as claimed in claim 11, wherein the paging information is identified by reading a paging block in a respective slot of at least four GSM frames of the GSM scheme.

13. The portable terminal as claimed in claim 11, wherein the controller determines whether the paging collision has occurred by identifying GSM frames on which the portable terminal has camped through each of the first SIM card and the second SIM card.

14. The portable terminal as claimed in claim 10, wherein the controller determines whether the paging collision has occurred by determining whether a first paging period for the first SIM card is equal to a second paging period for the second SIM card.

15. The portable terminal as claimed in claim 10, wherein the camp-on information is identified through a Stand-alone Dedicated Control Channel (SDCCH) from a predetermined cell.

16. The portable terminal as claimed in claim 11, wherein the camp-on information is System Information (SI) broadcasted from a predetermined cell to access the first and second communication networks.

17. The portable terminal as claimed in claim 10, wherein the controller performs the paging standby for the second communication network if the paging information doesn't correspond to the first SIM card.

* * * * *